United States Patent
Chimalamarri et al.

(10) Patent No.: US 12,511,839 B1
(45) Date of Patent: Dec. 30, 2025

(54) SELECTIVE HIT TESTING BASED ON A RELEVANCY CRITERION

(71) Applicant: Apple Inc., Cupertino, CA (US)

(72) Inventors: Anshu K. Chimalamarri, Sunnyvale, CA (US); Bart Trzynadlowski, Reno, NV (US)

(73) Assignee: APPLE INC., Cupertino, CA (US)

( * ) Notice: Subject to any disclaimer, the term of this patent is extended or adjusted under 35 U.S.C. 154(b) by 239 days.

(21) Appl. No.: 18/143,575

(22) Filed: May 4, 2023

Related U.S. Application Data

(60) Provisional application No. 63/339,188, filed on May 6, 2022.

(51) Int. Cl.
  G06T 19/00 (2011.01)
  G06T 15/00 (2011.01)

(52) U.S. Cl.
  CPC .......... G06T 19/006 (2013.01); G06T 15/005 (2013.01); G06T 2215/16 (2013.01)

(58) Field of Classification Search
  CPC ............................ G06T 19/003; G06T 19/006
  See application file for complete search history.

(56) References Cited

U.S. PATENT DOCUMENTS

| | | | | |
|---|---|---|---|---|
| 2010/0138736 A1* | 6/2010 | Wan | ................. | H04N 21/23412 715/234 |
| 2015/0205494 A1* | 7/2015 | Scott | ................... | G06F 3/04842 345/158 |
| 2015/0379770 A1* | 12/2015 | Haley, Jr. | ............... | G09G 5/006 345/633 |
| 2018/0074329 A1* | 3/2018 | Kazansky | ........... | G06F 3/04842 |
| 2020/0201514 A1 | 6/2020 | Murphy et al. | | |
| 2020/0320794 A1* | 10/2020 | Huang | ..................... | G06F 3/147 |
| 2021/0110557 A1* | 4/2021 | Busey | ................... | G06T 19/006 |
| 2021/0133929 A1* | 5/2021 | Ackerson | .............. | G06T 19/006 |
| 2024/0185545 A1* | 6/2024 | Tahara | ................... | G06V 20/20 |

FOREIGN PATENT DOCUMENTS

| | | | |
|---|---|---|---|
| WO | 2018226621 A1 | 12/2018 | |
| WO | 2021092194 A1 | 5/2021 | |

* cited by examiner

*Primary Examiner* — Charles Tseng
(74) *Attorney, Agent, or Firm* — Fernando & Partners, LLP

(57) ABSTRACT

A method is performed at an electronic device with one or more processors, a non-transitory memory, and a display. The method includes obtaining a scene graph that includes a plurality of nodes. Each of the plurality of nodes represents an object. The method includes identifying, within the plurality of nodes, a first subset of nodes based on each of the first subset of nodes satisfying a relevancy criterion with respect to a viewable region associated with the display. The first subset of nodes respectively represents a first subset of objects. The method includes assessing the first subset of objects in order to determine whether a spatial selector intersects with a particular object of the first subset of the objects. The method includes selecting the particular object based on determining that the spatial selector intersects with the particular object.

20 Claims, 16 Drawing Sheets

Scene Graph Representation 200

Relevancy Score Table 400

| Object | Relevancy Score (0 to 10) | Order to be Assessed |
|---|---|---|
| Second Painting 318 | 9 | 1 |
| Third Painting 320 | 7 | 2 |

Figure 4

SELECTIVE HIT TESTING BASED ON A RELEVANCY CRITERION

CROSS-REFERENCE TO RELATED APPLICATIONS

This application claims the benefit of U.S. Provisional Patent App. No. 63/339,188, filed on May 6, 2022, which is incorporated by reference in its entirety.

TECHNICAL FIELD

The present disclosure relates to hit testing and, in particular, to hit testing based on a scene graph.

BACKGROUND

In various circumstances, a device renders a scene graph in order to generate video frames for display. A limited amount of time and computational resources exist for generating each of the video frames. Moreover, in some circumstances, the device may perform hit testing to determine which object of the scene graph a user is targeting. However, assessing the entirety of the scene graph in order to perform hit testing is computationally expensive for the device, which is also tasked with performing the rendering and possibly other operations.

SUMMARY

In accordance with some implementations, a method is performed at an electronic device with one or more processors, a non-transitory memory, and a display. The method includes obtaining a scene graph that includes a plurality of nodes. Each of the plurality of nodes represents an object. The method includes identifying, within the plurality of nodes, a first subset of nodes based on each of the first subset of nodes satisfying a relevancy criterion with respect to a viewable region associated with the display. The first subset of nodes respectively represent a first subset of objects. The method includes assessing the first subset of objects in order to determine whether a spatial selector intersects with a particular object of the first subset of the objects. The method includes selecting the particular object based on determining that the spatial selector intersects with the particular object.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIG. 4 is an example of a relevancy score table that indicates relevancy scores in accordance with some implementations.

DESCRIPTION OF IMPLEMENTATIONS

Figure 1:
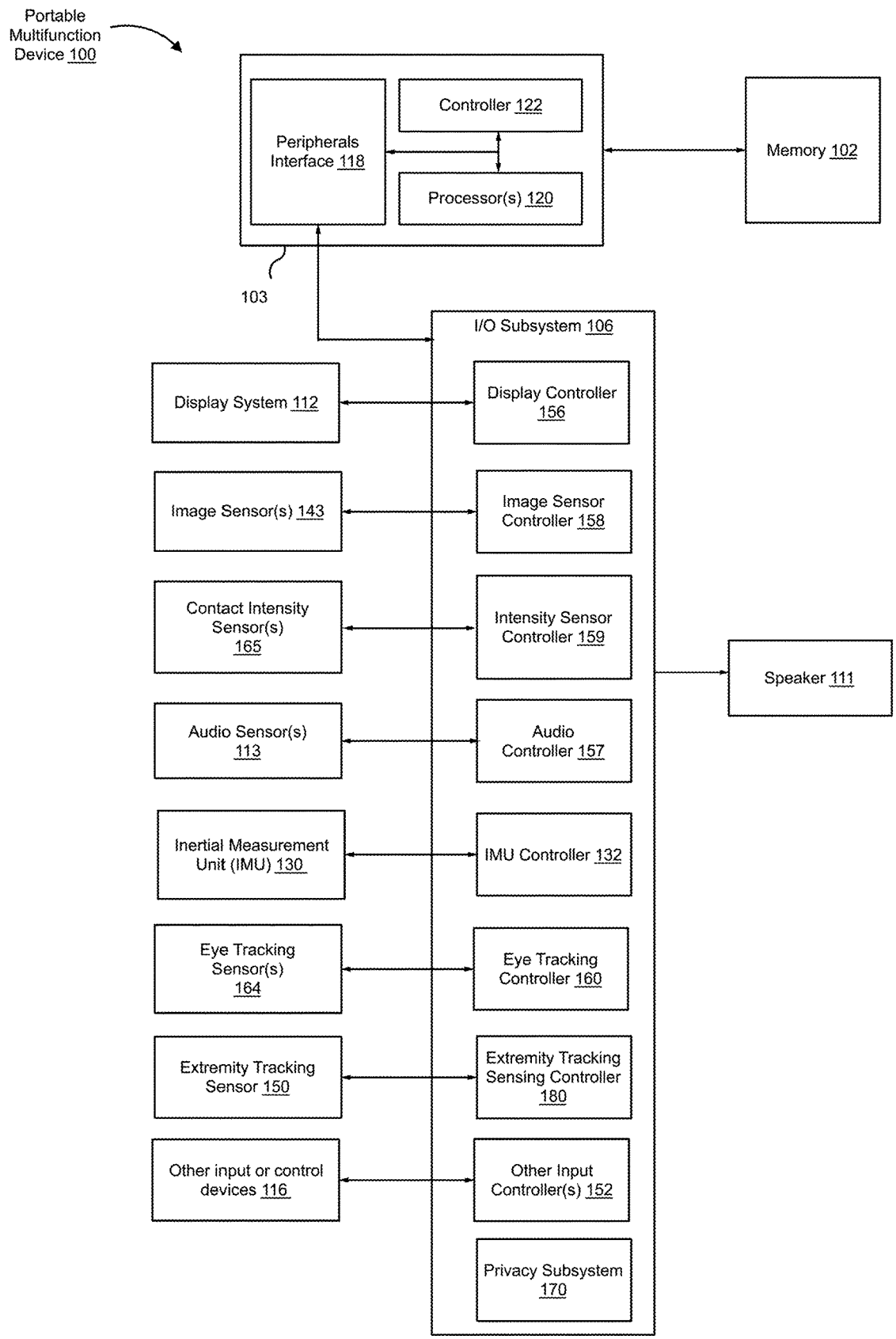
FIG. 1 is a block diagram of an example of a portable multifunction device in accordance with some implementations.

A rendering technique may include assessing a scene graph, which includes a plurality of nodes. For example, each of the plurality of nodes indicates a respective position of an object (e.g., a graphical element) within a scene. In order to generate the scene, the rendering technique may include rendering the objects, via a rendering system (e.g., a graphics processing unit (GPU)), in order to generate video frames of the scene. However, the rendering system has a limited amount of time and computational resources to generate each of the video frames. These limitations may be exacerbated based on a movement of an object within the scene, or based on a positional change of a device including the rendering system. In some circumstances, the device may perform hit testing to determine which of the rendered objects a user is currently targeting. However, assessing the entirety of the scene graph in order to perform hit testing is computationally expensive for the rendering system, which is also tasked with rendering the scene and possibly performing other operations.

By contrast, various implementations include methods, electronic devices, and systems of pruning (e.g., filtering out) an irrelevant portion of a scene graph in order to enable more efficient (e.g., less computationally expensive and faster) hit testing. To that end, an electronic device with a display identifies a portion of the scene graph that satisfies a relevancy criterion with respect to a viewable region associated with the display. For example, a node of the scene graph identifies a particular physical or extended reality (XR) environment (e.g., a home office), and the electronic device determines that the node satisfies the relevancy criterion because the viewable region corresponds to a portion of the particular physical or XR environment. As another example, the electronic device determines that a first node satisfies the relevancy criterion based on the first node indicating a first position (of a first object) within the viewable region, and determines that a second node does not satisfy the relevancy criterion based on the second node indicating a second position (of a second object) outside the viewable region. As yet another example, the relevancy criterion is satisfied when a respective position of an object is within the viewable region and not occluded (e.g., not blocked by a physical or virtual object). Moreover, the electronic device assesses respective objects, represented by nodes that satisfy the relevancy criterion, in order to determine whether a spatial selector intersects with a particular object of the respective objects. For example, the spatial selector is based on a gaze vector (e.g., eye tracking) or a head forward vector.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113

(e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, paired input device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired input device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired input device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
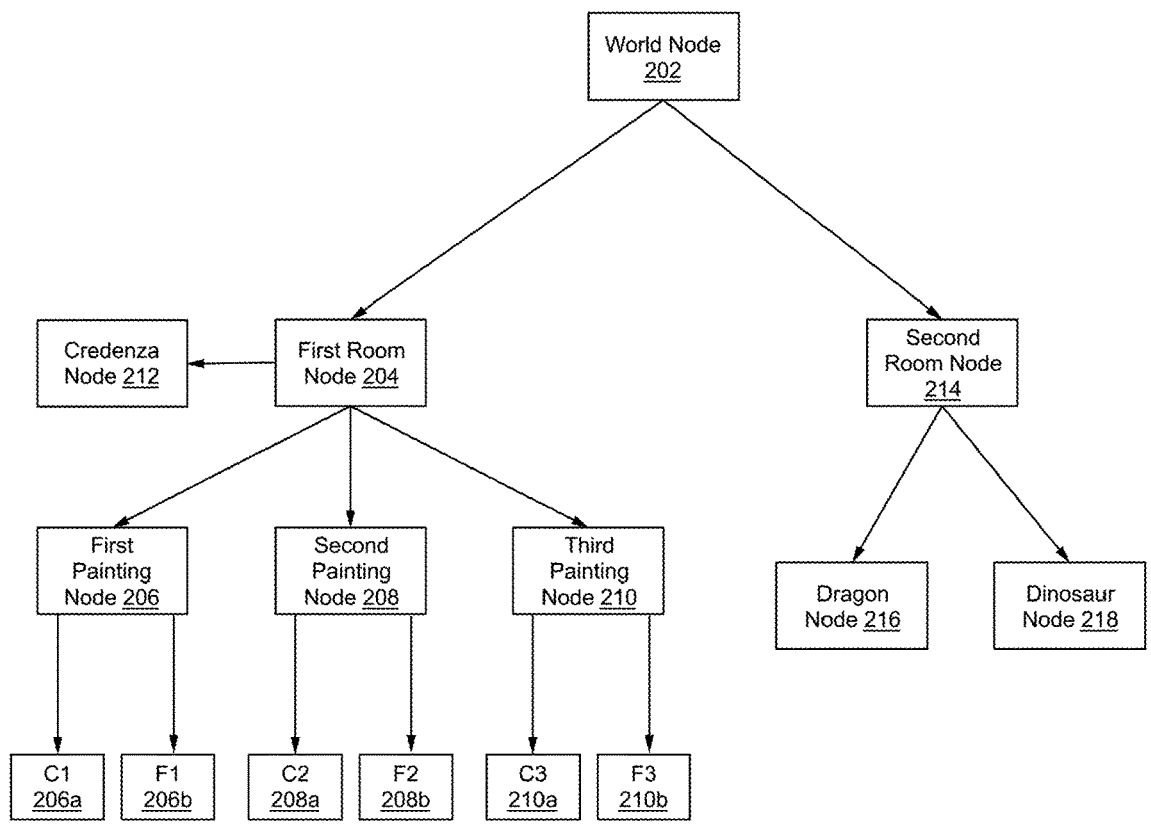
FIGS. 2A-2I are an example of identifying a first subset of nodes of a scene graph that satisfy a relevancy criterion in accordance with some implementations.

FIGS. 2A-2I are an example of identifying a first subset of nodes 230 of a scene graph that satisfy a relevancy criterion in accordance with some implementations. As illustrated in FIG. 2A, a scene graph representation 200 represents the scene graph. The scene graph includes various nodes, at various hierarchal levels. Each node represents an object, such as a bounded volumetric area (e.g., a virtual room), a two-dimensional object (2D) object, a three-dimensional (3D) object, a user interface (e.g., a menu), etc. For example, a scene graph may be characterized as a graph structure or tree structure, in which each node in the scene graph has a single parent, except for the top level node (sometimes referred to as a root node). As one example, as illustrated in FIG. 2A, the world node 202 is the root node because the world node 202 does not have any parent node. Accordingly, the world node 202 sits at the highest hierarchal level of the scene graph.

The world node 202 is the parent of two child nodes, a first room node 204 and a second room node 214. The first room node 204 is the parent of a credenza node 212, a first painting node 206, a second painting node 208, and a third painting node 210. The second room node 214 is the parent of a dragon node 216 and a dinosaur node 218. Each of the first room node 204 and the second room node 214 may be referred to as a group node. For example, a group node is a container that arranges its respective child nodes into graphs.

In some implementations, the first room node 204 may be associated with a first physical or XR environment (e.g., an office), whereas the second room node 214 may be associated with a second physical or XR environment (e.g., a kitchen). For example, the first room node 204 indicates respective positions, within the first physical or XR environment, of the credenza node 212, the first painting node 206, the second painting node 208, and the third painting node 210. As another example, the second room node 214 indicates respective positions, within the second physical or XR environment, of the dragon node 216 and the dinosaur node 218. In some implementations, respective child node(s) of the first room node 204 may be world-locked to the first physical or XR environment based on the respective positions, and respective child node(s) of the second room node 214 may be world-locked to the second physical or XR environment based on the respective positions.

A particular node may correspond to a compound object, which is comprised of constituent objects. For example, the first painting node 206 is defined by a first canvas node 206a and a first frame node 206b, the second painting node 208 is defined by a second canvas node 208a and a second frame node 208b, and the third painting node 210 is defined by a third canvas node 210a and a third frame node 210b.

Figure 3A:
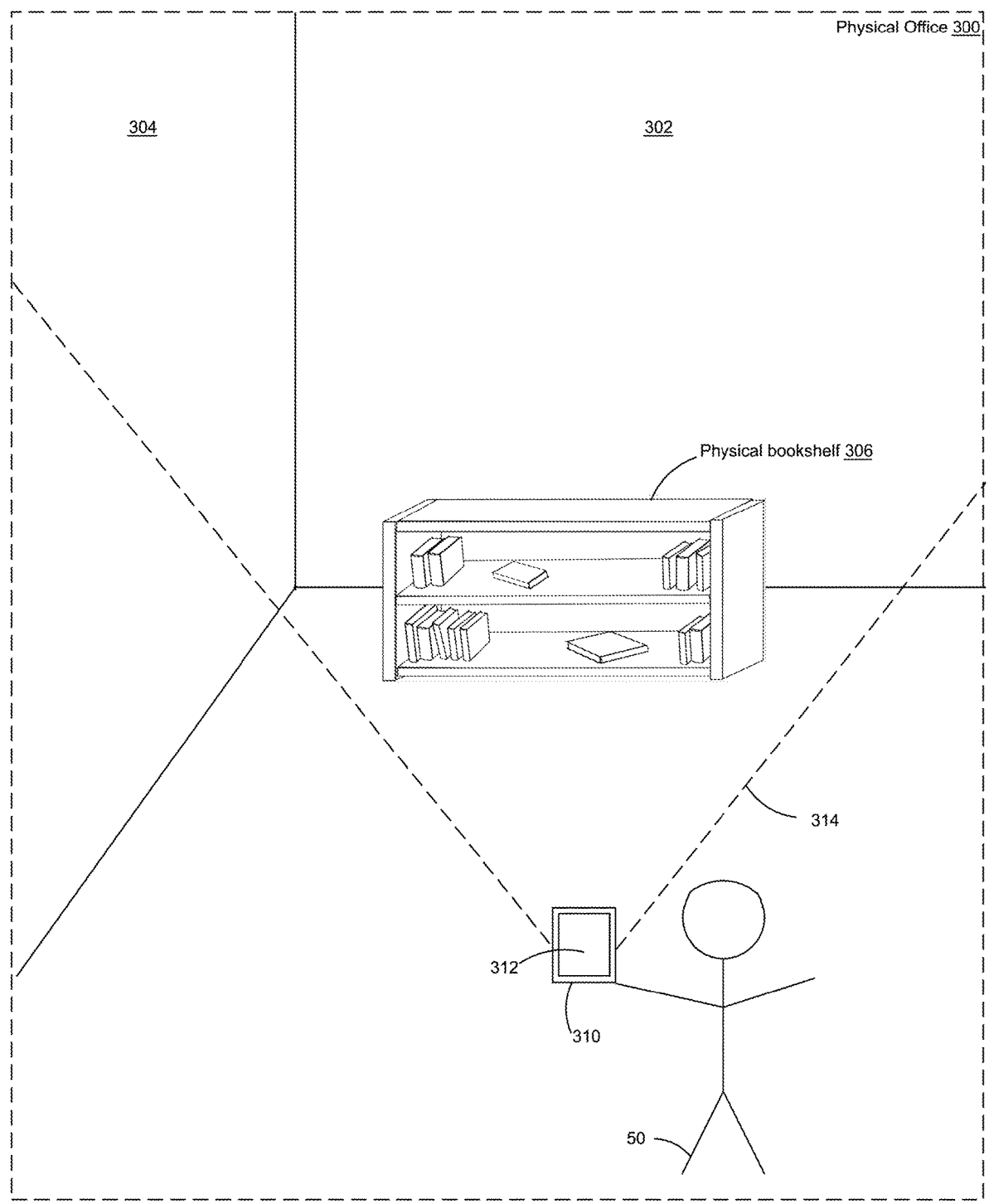
FIGS. 3A-3D are an example of performing hit testing with respect to the first subset of nodes that satisfy the relevancy criterion in accordance with some implementations.

Referring to FIG. 3A, a user 50 holds an electronic device 310 within a physical office 300. The physical office 300 includes a first physical wall 302, a second physical wall 304, and a physical bookshelf 306. In some implementations, the electronic device 310 corresponds to a mobile device, such as a smartphone, tablet, etc.

In some implementations, the electronic device 310 corresponds to a head-mountable device (HMD) that includes a stereo pair of integrated displays (e.g., built-in displays). In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) a representation of the physical office 300.

The electronic device 310 is configured to render at least a portion of the scene graph described with reference to FIG. 2A, and display the rendered scene graph on a display 312. The display 312 is associated with a viewable region 314 that includes the physical bookshelf 306, and respective portions of the first physical wall 302 and the second physical wall 304. The first room node 204 is associated with the physical office 300, whereas the second room node 214 is not associated with the physical office 300. For example, the first room node 204 includes a physical office identifier that identifies various features of the physical office 300 (e.g., bookshelf), whereas the second room node 214 includes a physical or virtual kitchen identifier that identifies various features of a physical or virtual kitchen (e.g., a virtual refrigerator).

As illustrated in FIGS. 2B-2I, the electronic device 310 identifies the first subsets of nodes 230 (hereinafter "the first subset 230") of the scene graph that satisfies a relevancy criterion, and identifies a second subsets of nodes 220 (hereinafter "the second subset 220") of the scene graph that does not satisfy the relevancy criterion. As will be discussed below, in order to determine which object the user 50 selects, the electronic device 310 assesses the first subset 230, but foregoes assessing the second subset 220. Accordingly, the second subset 220 is effectively pruned from the assessment, reducing processing utilization by the electronic device 310.

Figure 2B:
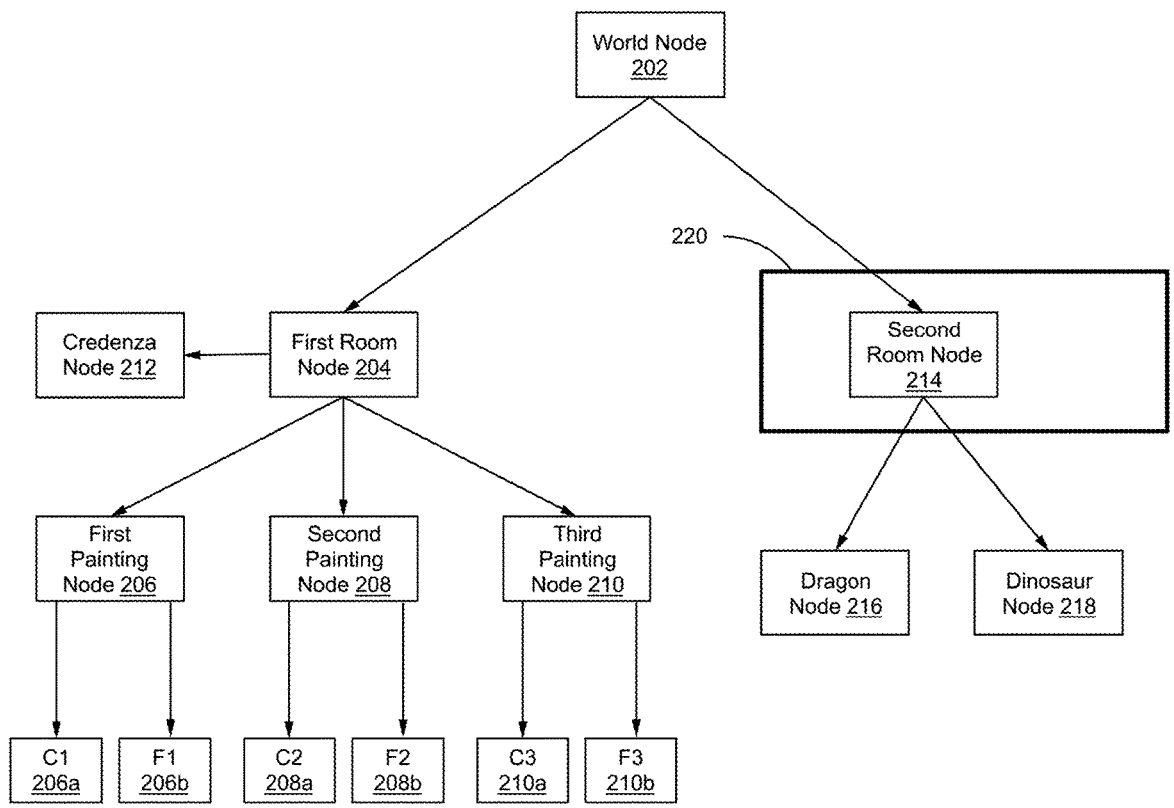
Figure 2C:
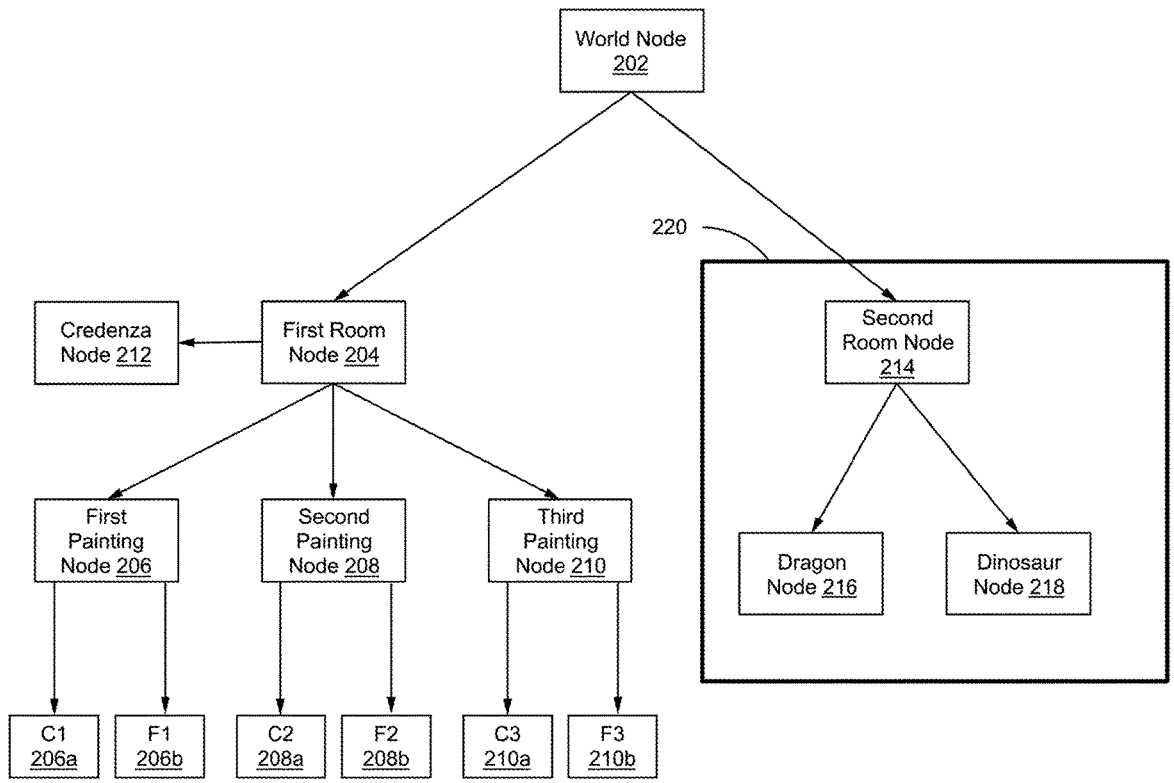

The relevancy criterion may be based on the viewable region 314, which corresponds to a portion of the physical office 300. In other implementations, the relevancy criterion may be based on a viewable region (e.g., field of view) of an XR environment. In some implementations, because the second room node 214 identifies a physical kitchen that is different from the physical office 300, the electronic device 310 determines that the second room node 214 does not satisfy the relevancy criterion. For example, in some implementations, the electronic device 310 includes an image sensor that captures image data of the physical office 300, and performs computer vision with respect to the image data. Continuing with this example, the computer vision technique generates a semantic label of "bookshelf," which is not identified by the second room node 214. Accordingly, the electronic device 310 identifies the second room node 214 as part of the second subset 220, as illustrated in FIG. 2B. Moreover, in some implementations, in response to determining that the second room node 214 does not satisfy the relevancy criterion, the electronic device 310 adds, to the second subset 220, the child nodes of the second room node 214. Namely, as illustrated in FIG. 2C, the electronic device 310 adds the dragon node 216 and the dinosaur node 218 to the second subset 220. Accordingly, the electronic device 310 reduces processor utilization by foregoing determining whether or not the dragon node 216 or the dinosaur node 218 satisfies the relevancy criterion. In some implementations, based on determining that the second room node 214 does not satisfy the relevancy criterion, the electronic device 310 concurrently identifies the second room node 214, the dragon node 216, and the dinosaur node 218 as part of the second subset 220.

In some implementations, the electronic device 310 may assess the relevancy criterion of a node based on positional information associated with the node and a viewpoint of the electronic device 310. For example, the electronic device 310 may determine whether a location associated with a node (e.g., a location of an object represented by the node) is within a viewing frustrum of a virtual camera corresponding to the viewpoint of electronic device 310 within a common coordinate system. A node having a location outside the viewing frustum may be added to the second subset 220. In some implementations, electronic device 310 may determine that a node has a location outside the viewing frustrum if the entire area or volume of the object represented by the node is located outside the viewing frustum. In some implementations, a child node may have a location that is located entirely within the location of a parent node. In these situations, a node having a location outside the viewing frustrum may be added to the second subset 220 along with all of its child nodes.

Figure 2D:
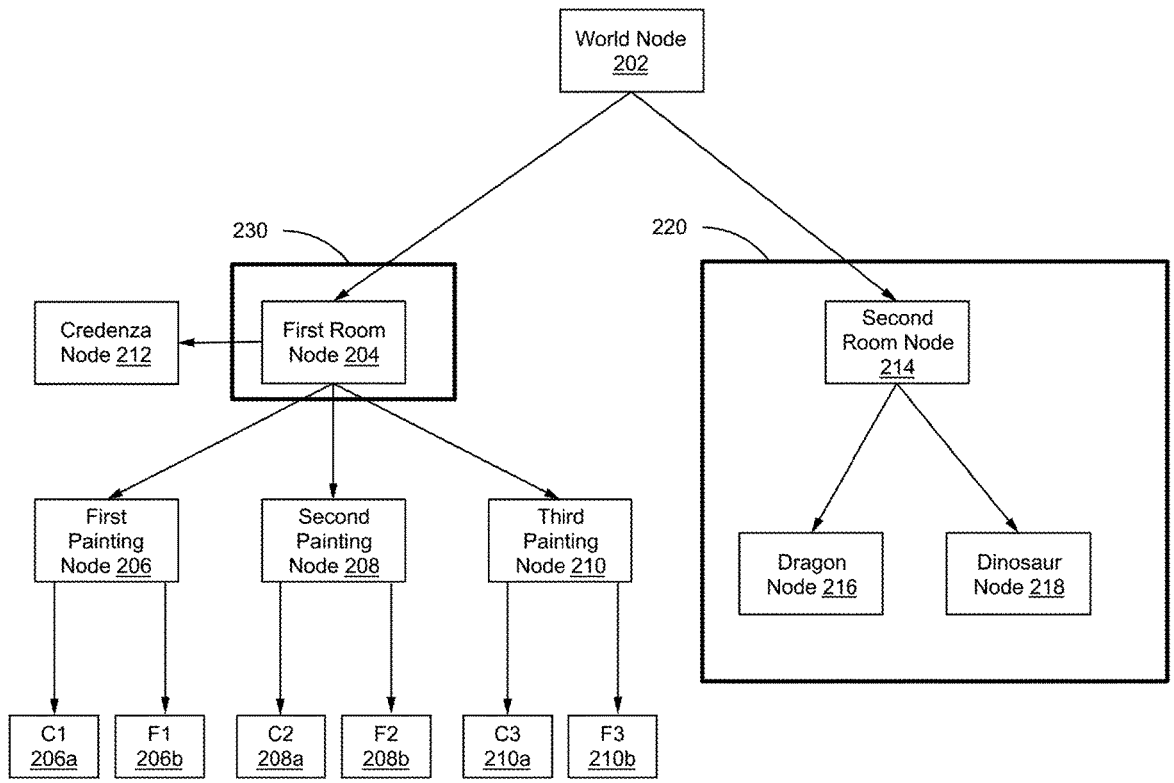

In some implementations, the electronic device 310 determines that a node satisfies the relevancy criterion based on the node identifying a relevant physical environment (e.g., a physical environment that includes the viewable region 314). For example, the electronic device 310 captures, via an image sensor, image data of the physical office 300, and performs computer vision with respect to the image data. The image sensor may have a field of view that approximates the viewable region 314. Based on the computer vision technique, the electronic device 310 generates an object label that identifies the physical bookshelf 306. Moreover, the electronic device 310 determines that the object label is sufficiently related to an identifier of the first room node 204. For example, the first room node 204 includes an identifier identifying an "office." As another example, the first room node 204 includes an identifier identifying a physical feature of the physical office 310, such as a "bookshelf." As yet another example, the first room node 204 includes an identifier identifying a physical surface (e.g., the first physical wall 302) or attribute thereof of the physical office 310, such as color, smoothness, size, etc. Accordingly, the electronic device 310 determines that the first room node 204 satisfies the relevancy criterion, and thus identifies the first room node 204 as part of the first subset 230, as illustrated in FIG. 2D.

In some implementations, the electronic device 310 determines that a node satisfies the relevancy criterion based on a position of an object (represented by the node) satisfying the relevancy criterion. The node indicates the position of the object. For example, the electronic device 310 may determine whether a location associated with a node (e.g., a location of an object represented by the node) is within a viewing frustrum of a virtual camera corresponding to the viewpoint of electronic device 310 within a common coordinate system. A node having a location within the viewing frustum may be determined to satisfy the relevancy criterion. In some implementations, electronic device 310 may determine that a node has a location within the viewing frustrum if at least a portion of the area or volume of the object represented by the node is located within the viewing frustum. Since an area or volume of the object represented by the child node may not occupy the entire area or volume of the object represented by the parent node, electronic device 310 may further determine whether the child node satisfies the relevancy criterion in the same way as done for the parent. For example, in response to determining that a parent node satisfies the relevancy criterion, the electronic device 310 determines whether an object represented by a child node (of the parent node) also satisfies the relevancy criterion. As one example, in response to determining that the first room node 204 satisfies the relevancy criterion (coarse grain determination), the electronic device 310 determines whether each of the respective objects represented by child nodes (fine grain determinations) satisfies the relevancy criterion. Namely, the electronic device 310 determines whether respective objects represented by the credenza node 212, the first painting node 206, the second painting node 208, and third painting node 210 satisfy the relevancy criterion.

Figure 3B:
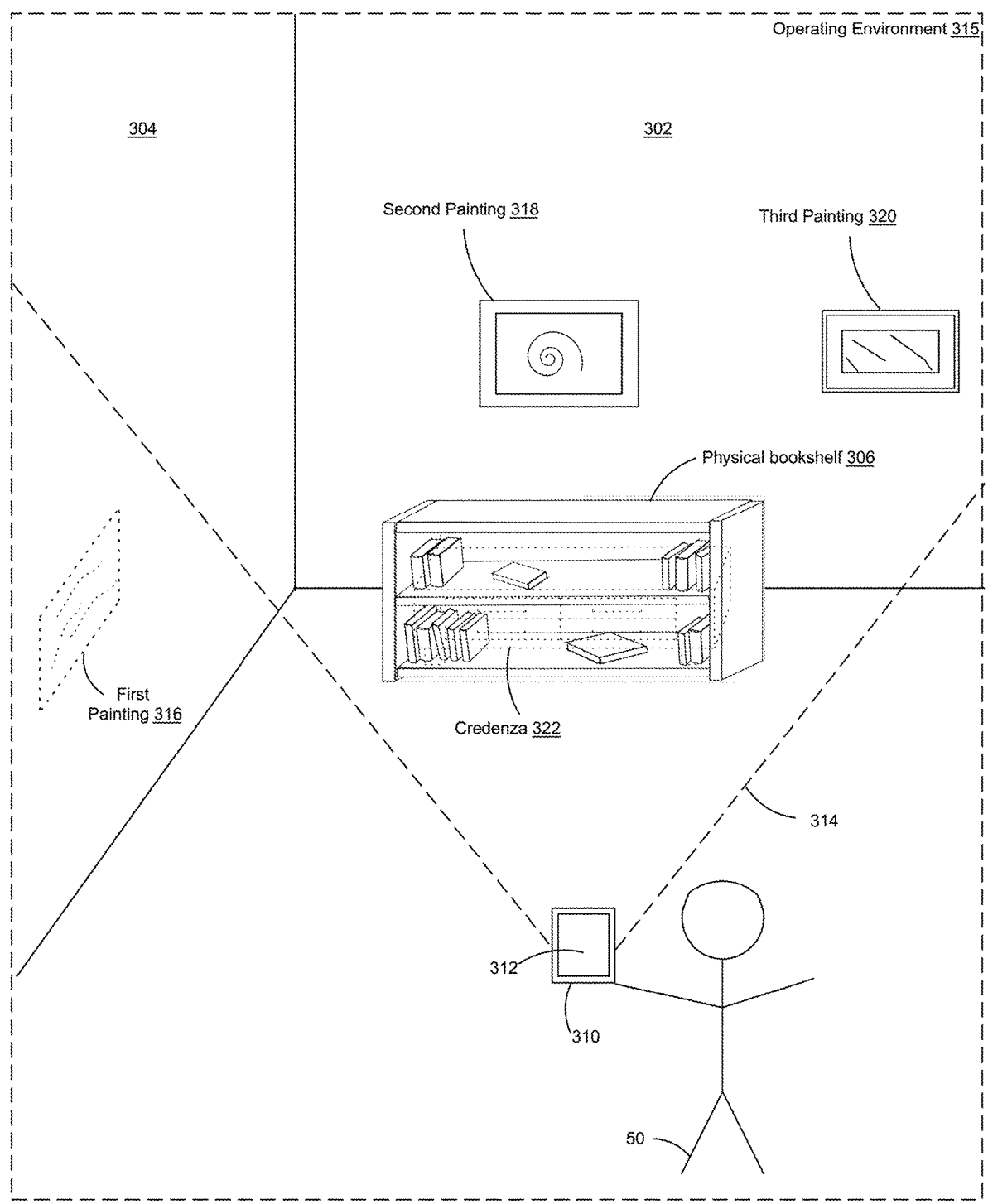

As illustrated in FIG. 3B, the electronic device 310 operates according to an operating environment 315, which includes rendering a portion of the scene graph, and displaying, on the display 312, a portion the physical office 300 and the rendered portion of the scene graph, both of which may be based on the viewable region 314.

Figure 2E:
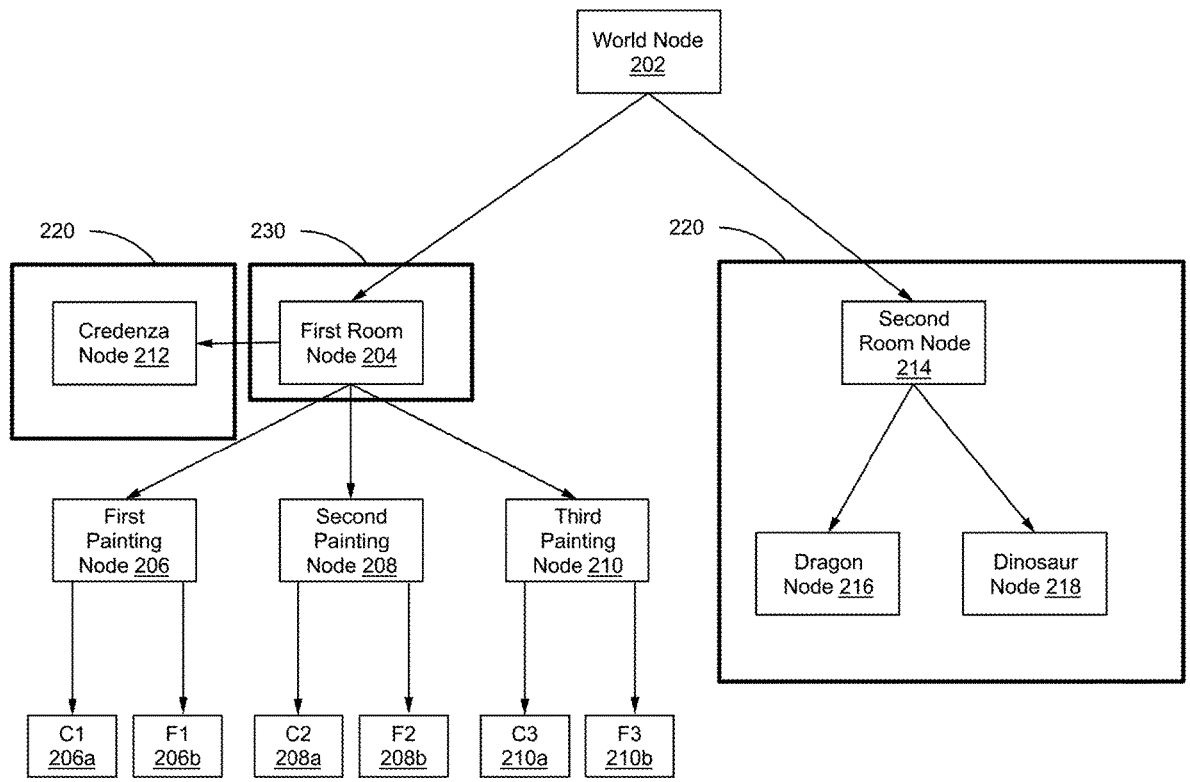

For example, the credenza node 212 represents a credenza 322, and the credenza node 212 indicates a position of the credenza 322. As illustrated in FIG. 3B, the credenza 322 is occluded by (behind) the physical bookshelf 306 and thus is not viewable by the user 50. The credenza 322 is illustrated in FIG. 3B with dotted lines to indicate that the credenza 322 is not currently viewable on the display 312. Because the credenza 322 is occluded, the electronic device 310 determines that the position of the credenza 322 does not satisfy a non-occlusion condition, and thus determines that the credenza node 212 does not satisfy the relevancy criterion. Accordingly, based on determining that the credenza node 212 does not satisfy the relevancy criterion, the electronic device 310 adds the credenza node 212 to the second subset 220, as illustrated in FIG. 2E.

Figure 2F:
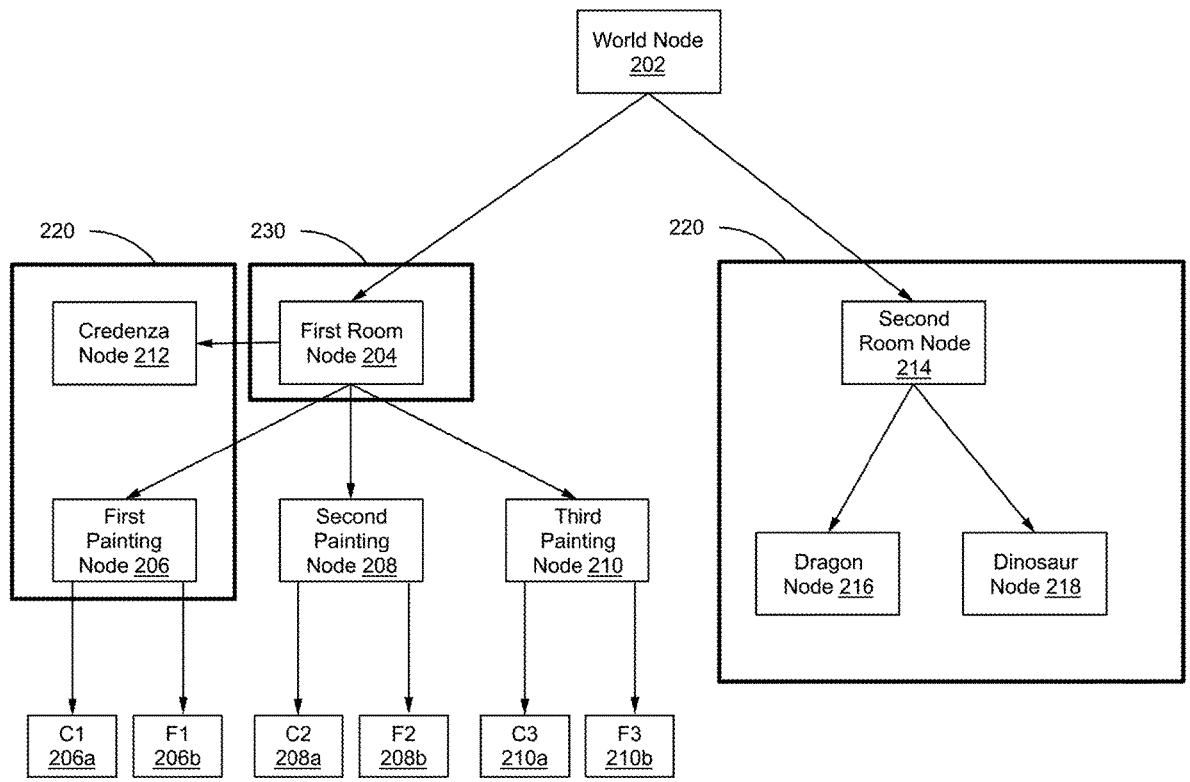

As another example, the first painting node 206 represents a first painting 316, and the first painting node 206 indicates a position of the first painting 316. As illustrated in FIG. 3B, the first painting 316 is world-locked to a portion of the second physical wall 304 that is outside of the viewable region 314, and thus the first painting 316 is neither rendered nor displayed. The first painting 316 is illustrated in FIG. 3B with dotted lines to indicate that the electronic device 310 does not display the first painting 316. Because the first painting 316 has a position that is outside of the viewable region 314, the electronic device 310 determines that the first painting node 206 does not satisfy the relevancy criterion. In other words, the first painting node 206 is not relevant to an assessment as to whether the user 50 selects the first painting 316. Accordingly, based on determining that the first painting node 206 does not satisfy the relevancy criterion, the electronic device 310 adds the first painting node 206 to the second subset 220, as illustrated in FIG. 2F.

Figure 2G:
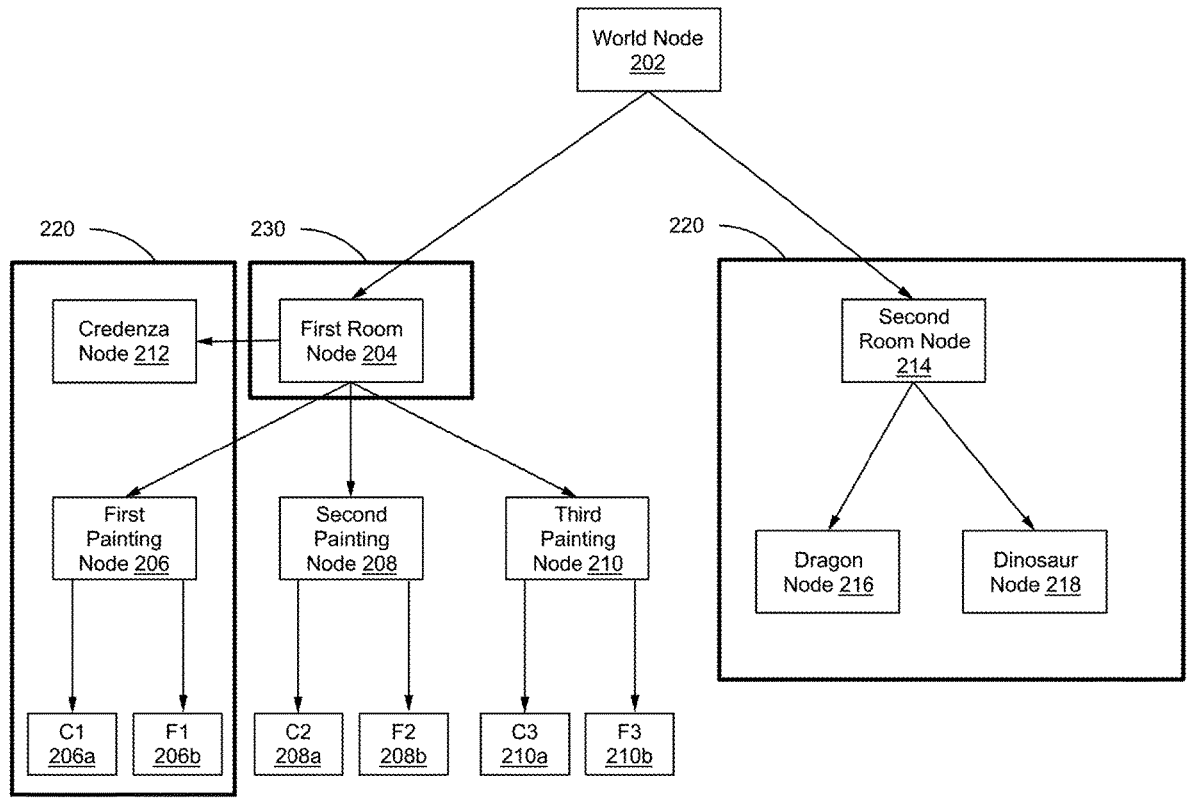

In some implementations, a child node is classified based on the identification of the compound node, without a determination as to whether the child node satisfies the relevancy criterion. For example, the first painting node 206 is a compound node, comprised of a first canvas node 206a and a first frame node 206b. As illustrated in FIG. 2G, based on determining that the first painting node 206 does not satisfy the relevancy criterion, the electronic device 310 adds the first canvas node 206a and the first frame node 206b to the second subset 220, without determining whether either of the child nodes 206a/206b satisfies the relevancy criterion. The electronic device 310 reduces processor utilization by foregoing the determination regarding the child nodes 206a/206b.

Figure 2H:
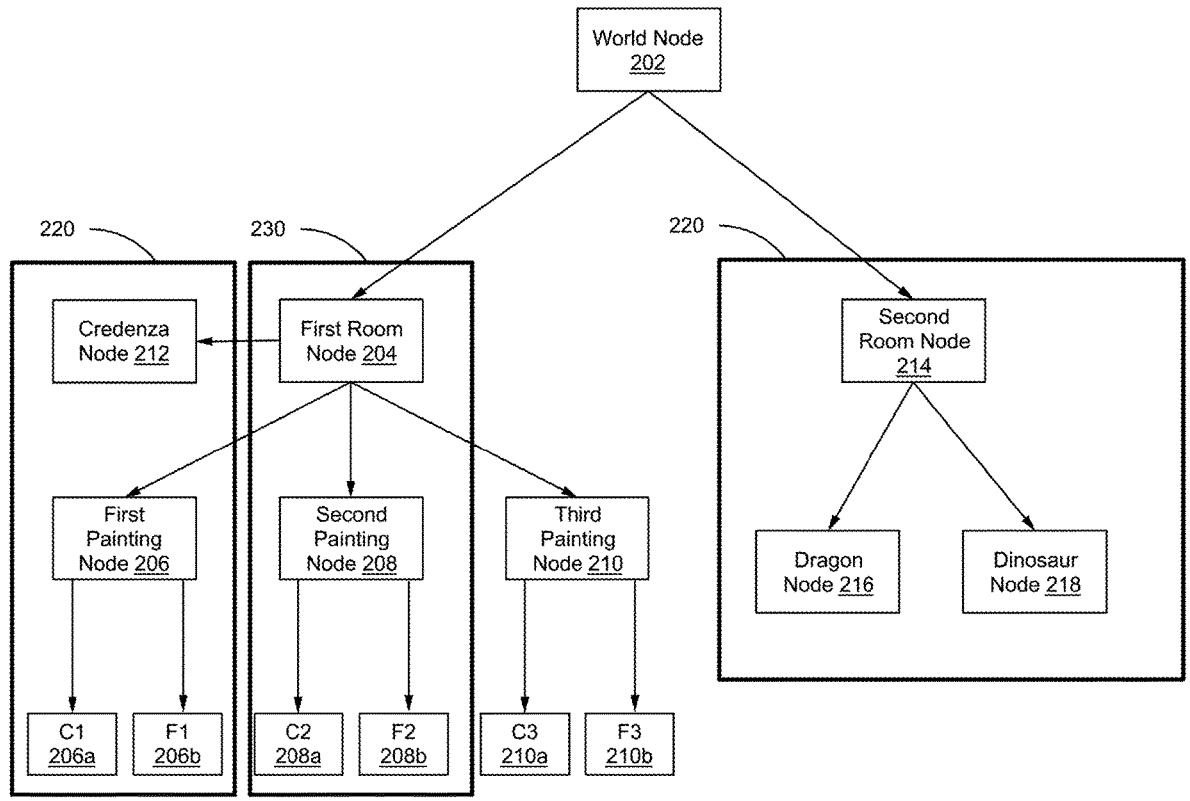

As another example, the second painting node 208 represents a second painting 318, and the second painting node 208 indicates a position of the second painting 318. As illustrated in FIG. 3B, the second painting 318 is world-locked to the first physical wall 302 within the viewable region 314, and is not occluded. Accordingly, the second painting 318 is displayed on the display 312, and is viewable by the user 50. The electronic device 310, thus, determines that the second painting node 208 satisfies the relevancy criterion, and accordingly identifies the second painting node 208 as part of the first subset 230, as illustrated in FIG. 2H. In some implementations and as illustrated in FIG. 2H, based on determining that the second painting node 208 satisfies the relevancy criterion, the electronic device 310 adds, to the first subset 230, the second canvas node 208a and the second frame node 208b (constituent parts of the compound, second painting node 208), without determining whether either of the second canvas node 208a or the second frame node 208b satisfies the relevancy criterion. The electronic device 310 reduces processor utilization by foregoing a determination regarding the child nodes 208a/208b. In other implementations, the electronic device 310 may determine whether the constituent parts of the compound (e.g., second canvas node 208a and second frame node 208b) satisfy the relevancy criterion. While evaluating the constituent parts may increase processor utilization, an overall decrease in processor utilization may occur if one or more of the constituent parts are added to the second subset 220, allowing the electronic device 310 to forgo performing a more computationally expensive operation (e.g., hit testing) on the one or more of the constituent parts.

Figure 2I:
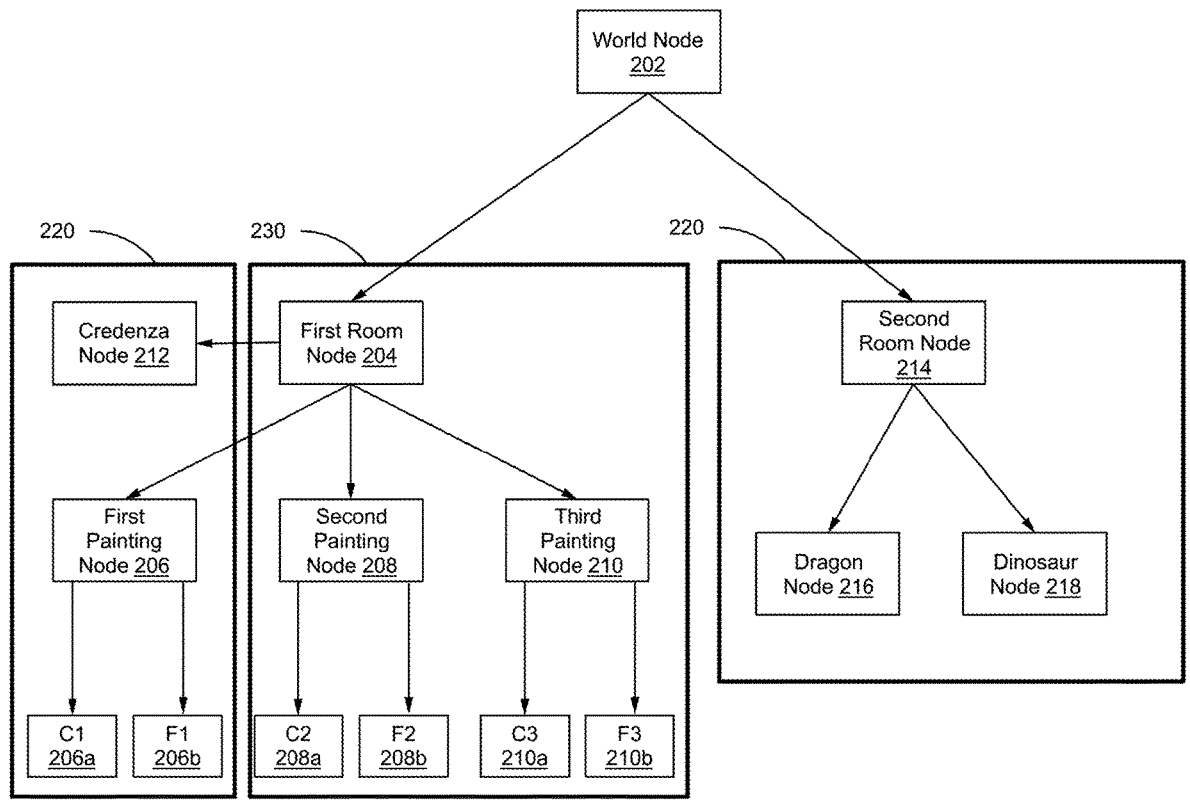

As yet another example, the third painting node 210 represents a third painting 320, and the third painting node 210 indicates a position of the third painting 320. As illustrated in FIG. 3B, the third painting 320 is world-locked to the first physical wall 302 within the viewable region 314, and is not occluded. Accordingly, the third painting 320 is displayed on the display 312, and is viewable by the user 50. The electronic device 310, thus, determines that the third painting node 210 satisfies the relevancy criterion, and accordingly identifies the third painting node 210 as part of the first subset 230, as illustrated in FIG. 2I. In some implementations and as illustrated in FIG. 2I, based on determining that the third painting node 210 satisfies the relevancy criterion, the electronic device 310 adds, to the first subset 230, the third canvas node 210a and the third frame node 210b (constituent parts of the compound, third painting node 210), without determining whether either of the third canvas node 210a or the third frame node 210b satisfies the relevancy criterion. The electronic device 310 reduces processor utilization by foregoing a determination regarding the child nodes 210a/210b. In other implementations, the electronic device 310 may determine whether the constituent parts of the compound (e.g., third canvas node 210a and the third frame node 210b) satisfy the relevancy criterion. While evaluating the constituent parts may increase processor utilization, an overall decrease in processor utilization may occur if one or more of the constituent parts are added to the second subset 220, allowing the electronic device 310 to forgo performing a more computationally expensive operation (e.g., hit testing) on the one or more of the constituent parts.

According to various implementations, the electronic device 310 assesses a first subset of objects, respectively represented by the first subset 230, in order to determine whether a spatial selector intersects with a particular object of the first subset of objects. Determining whether the spatial selector intersects with the particular object is sometimes referred to as hit testing. During hit testing, the electronic device 310 may forego assessing respective objects represented by the second subset 220, thereby reducing resource utilization by the electronic device 310. Examples of the spatial selector include a gaze vector that indicates a gaze of an eye of a user 50, an extremity vector that is based on a position of an extremity of the user 50, a head forward vector that characterizes a current position (e.g., orientation) of the electronic device 310, etc.

Figure 3C:
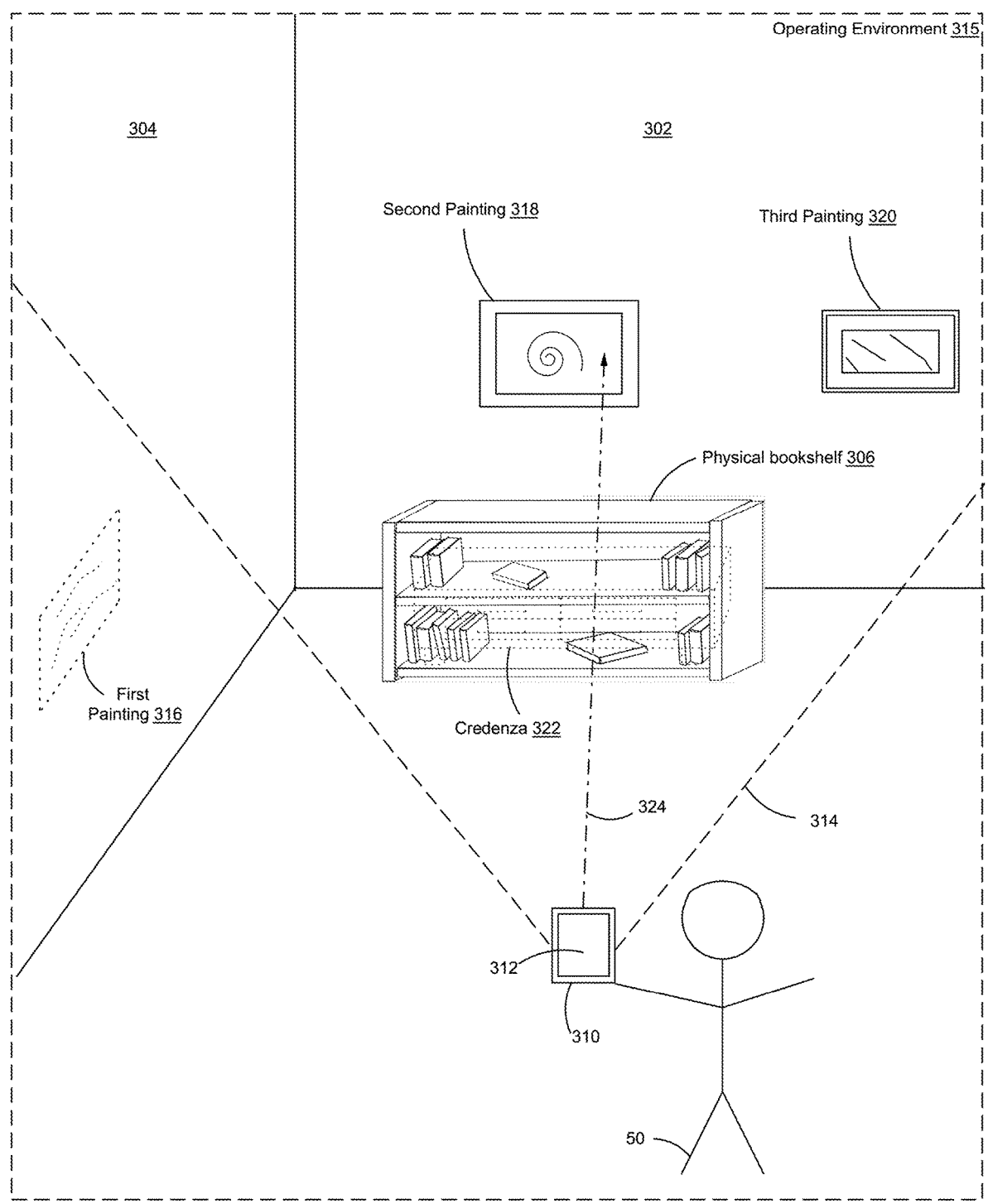
Figure 3D:
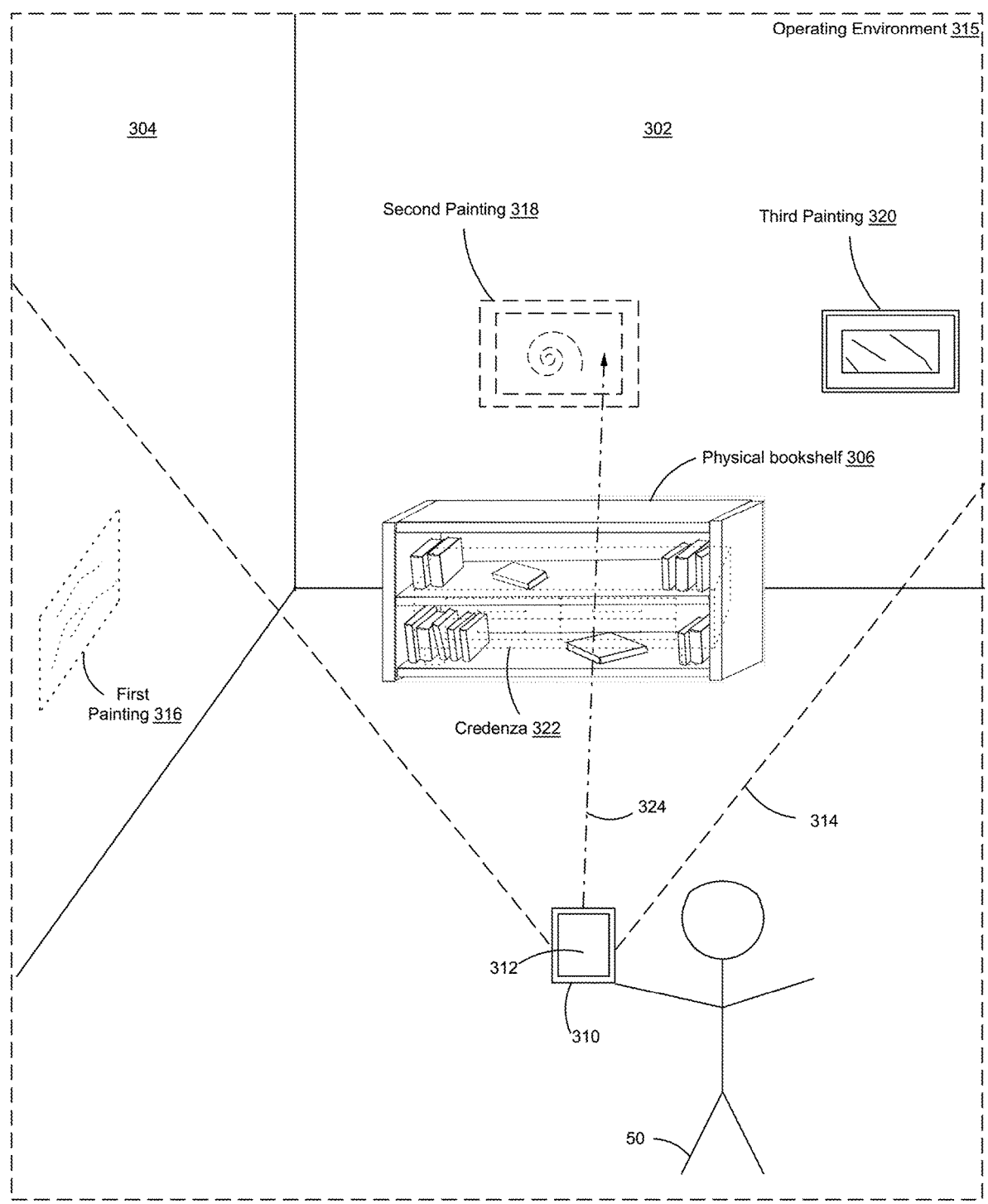

For example, as illustrated in FIG. 3C, the electronic device 310 determines, based in part on eye tracking data, a gaze vector 324 associated with an eye of the user 50. To that end, in some implementations, the electronic device 310 includes an image sensor that captures image data of the eye, and generates (e.g., via computer vision) the eye tracking data based on the position of the eye within the image data. The eye of the user 50 gazes at the second painting 318, and therefore the gaze vector 324 intersects with the second painting 318. For example, the electronic device 310 assesses respective positions of objects indicated by the first subset 230) that intersect with the gaze vector 324, and foregoes assessing respective positions of objects indicated by the second subset 220 that do not intersect with the gaze vector 324. To that end, the electronic device 310 may assess, based on the first subset 230, respective positions of the second painting 318 and the third painting 320, in view of the eye tracking data. However, the electronic device 310 does not assess respective positions of objects indicated by the dragon node 216, the dinosaur node 218, the credenza node 212, or the first painting node 206. In response to determining that the gaze vector 324 intersects with the second painting 318, the electronic device 310 selects the second painting 318, and may accordingly change the appearance of the second painting 318, as illustrated in FIG. 3D. One of ordinary skill in the art will appreciate that, in some implementations, the electronic device 310 selects a particular object without changing the appearance of the object.

In some implementations, the electronic device 310 determines a plurality of relevancy scores respectively associated with the first subset of objects. A higher relevancy score may indicate that the user 50 is more likely to select (e.g., gaze at) a corresponding object. Each of the plurality of relevancy scores may be based on a respective position of a corresponding object of the first subset of objects. For example, as illustrated in FIG. 4, a relevancy score table 400 indicates a relevancy score of '9' for the second painting 318, and a relevancy score of '7' for the third painting 320. In some implementations, for a particular object of the first subset of objects, the relevancy score is inversely related to a distance between the center of the viewable region (or a spatial selector) and the particular object. For example, with reference to FIG. 3B, the electronic device 310 determines a higher relevancy score for the second painting 318 because the second painting 318 is nearer to the center of the viewable region 318 than is the third painting 320.

In some implementations, the order of assessing the first subset of objects in view of a spatial selector is based on the relevancy scores. For example, because the second painting 318 has a higher relevancy score than the third painting 320, the electronic device 310 performs hit testing with respect to the second painting 318 (represented by the second painting node 208) before performing hit testing with respect to the third painting 320 (represented by the third painting node 210), as indicated in the last column of the relevancy score table 400.

Figure 5:
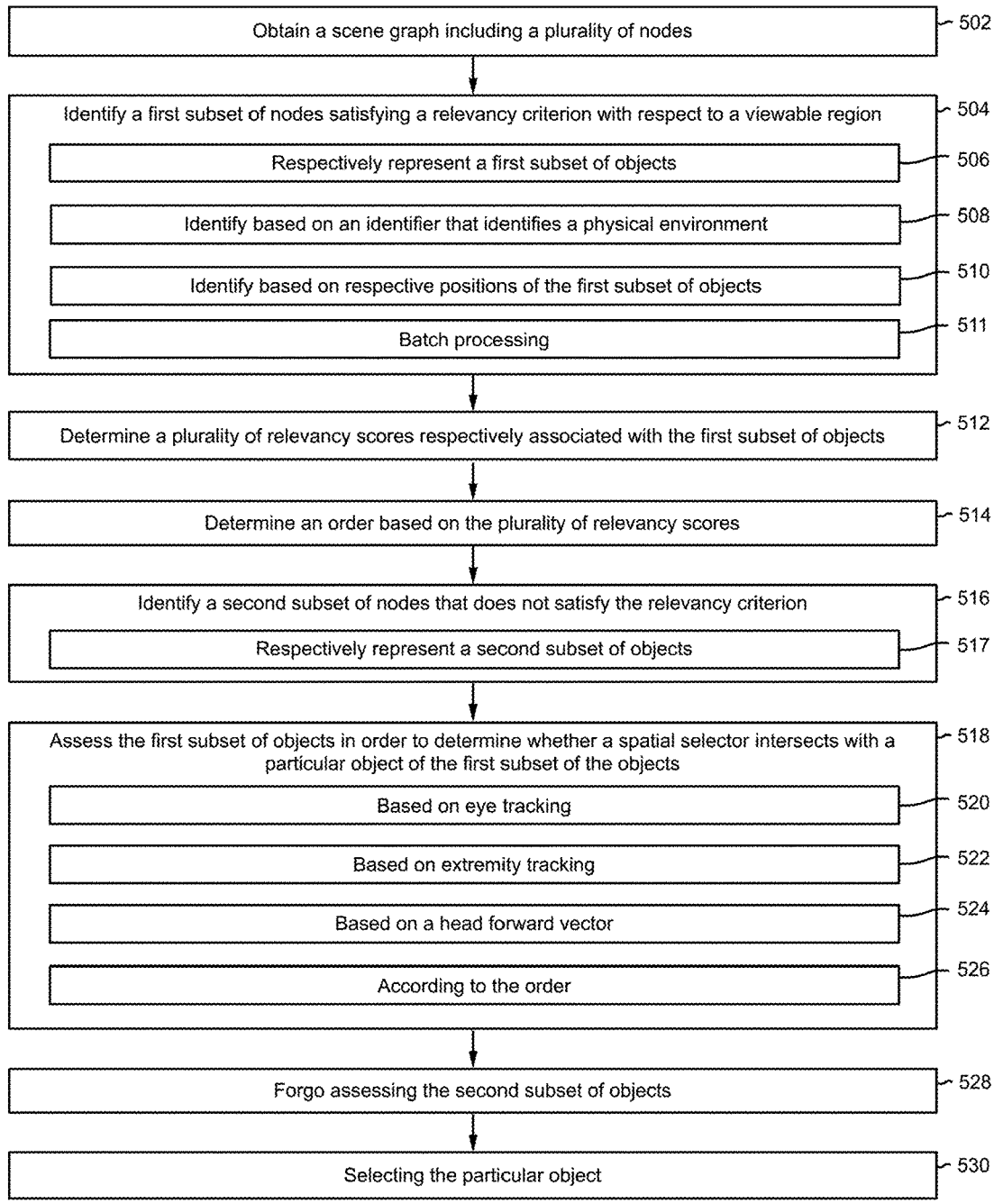
FIG. 5 is an example of a flow diagram of a method of performing hit testing with respect to a first subset of nodes that satisfy a relevancy criterion in accordance with some implementations.

FIG. 5 is an example of a flow diagram of a method 500 of performing hit testing with respect to a first subset of nodes that satisfy a relevancy criterion in accordance with some implementations. In various implementations, the method 500 or portions thereof are performed by an electronic device including a display (e.g., the electronic device 100 in FIG. 1, or the electronic device 310 in FIGS. 3A-3D). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes obtaining a scene graph that includes a plurality of nodes. Each of the plurality of nodes represents an object. In some implementations, the scene graph may include other nodes that do not represent an object. For example, with reference to FIGS. 2A and 3B, the credenza node 212 represents the credenza 322, and the second painting node 208 represents the second painting 318. An object may correspond to a two-dimensional (2D) object, such as a user interface element (e.g., a menu). An object may correspond to a three-dimensional (3D) object or environment, such as a volumetric cube or a virtual room. The scene graph may indicate a hierarchal relationship between each of the plurality of nodes, such as via a tree structure or a graph structure. For example, with reference to FIG. 2A, the first room node 204 is the parent of various child nodes, including the credenza node 212, the first painting node 206, the second painting node 208, and the third painting node 210. In some implementations, the scene graph identifies a particular physical or XR environment. For example, with reference to FIGS. 2A and 3A, the first room node 204 includes an identifier that identifies the physical office 300. In some implementations, the scene graph indicates respective positions of the plurality of objects (and, optionally, an area or volume occupied by the plurality of objects). For example, with reference to FIGS. 2A and 3B, the second painting node 208 indicates a position of a physical anchor point of the first physical wall 302, to which the electronic device 310 world locks the second painting 318. In some implementations, the plurality of nodes includes a compound node, which is the parent of multiple child nodes, each of which comprises a respective portion of the compound node. For example, with reference to FIG. 2A, the first painting node 206 is a compound node, and the first painting node 206 is a parent node of the first canvas node 206a and the first frame node 206b. In some implementations, the plurality of nodes includes a group node, which is the parent of child nodes that are members of the group.

As represented by block 504, the method 500 includes identifying, within the plurality of nodes, a first subset of nodes (e.g., the first subset 230 illustrated in FIG. 2I) based on each of the first subset of nodes satisfying a relevancy criterion with respect to a viewable region associated with the display. The relevancy criterion may be satisfied when a particular node is relevant to the assessment whether a user selects an object represented by the particular node. As represented by block 506, the first subset of nodes respectively represent a first subset of objects. For example, with reference to FIGS. 2I and 3B, the first subset 230 includes a second painting node 208 that represents the second painting 318, and the first subset 230 includes the third painting node 210 that represents the third painting 320.

In some implementations, the method 500 includes identifying the first subset of nodes while presenting (e.g., displaying on a display) an XR environment. For example, the XR environment is defined, at least in part, by a plurality of objects respectively represented by the plurality of nodes. In some implementations, the viewable region includes a portion of the XR environment, and the portion of the XR environment includes the first subset of objects (respectively represented by the first subset of nodes). In some implementations, the XR environment includes a computer-generated feature and a physical feature, such as an augmented reality (AR) environment or a mixed reality (MR) environment. For example, with reference to FIG. 3B, the operating environment 315 corresponds to an AR environment, in which the second painting 318 is presented along with the physical bookshelf 306. In some implementations, the XR environment is a virtual reality (VR) environment. For example, in a VR environment, computer-generated features (e.g., a virtual world or a virtual object, such as the second painting 318) are presented on the display, but no physical features (e.g., the first physical wall 302, the second physical wall 304, and the physical bookshelf 306) are presented on the display.

As represented by block 508, in some implementations, the method 500 includes determining that a particular node satisfies the relevancy criterion, based on an identifier that identifies a (relevant) physical or XR environment. For example, with reference to FIGS. 2D and 3A, based on the viewable region 314 corresponding to a portion of the physical office 300, and based on the first room node 204 including an identifier identifying the physical office 300, the electronic device 310 determines that the first room node 204 satisfies the relevancy criterion. For example, the identifier identifies a portion of the physical office 300 or a physical object (e.g., the physical bookshelf 306) within the physical office 300. Continuing with this example, the electronic device 310 identifies the portion of the physical office 300 or the physical object (e.g., via computer vision), and accordingly determines that the first room node 204 satisfies the relevancy criterion.

As represented by block 510, in some implementations, identifying the first subset of nodes includes determining that each of the respective positions of the first subset of objects satisfies the relevancy criterion. In some implementations, satisfaction of the relevancy criterion is based on each of the respective positions being within the viewable region. As one example, with reference to FIGS. 2H and 3B, the electronic device 310 determines that the second painting node 208 satisfies the relevancy criterion because the second painting node 208 indicates that a position of the second painting 318 is within the viewable region 314. In some implementations, satisfaction of the relevancy criterion is based on a respective position satisfying a non-occlusion condition. Continuing with the previous example, determining that the second painting node 208 satisfies the relevancy criterion is further based on the position of the second painting 318 not being occluded by a physical feature of the physical office 300. As a counterexample, and with reference to FIGS. 2E and 3B, the electronic device 310 determines that the credenza node 212 does not satisfy the relevancy criterion because the credenza 322 is occluded by the physical bookshelf 306. Accordingly, the method 500 may include identifying the credenza node 212 as part of a second subset of objects, as represented by block 516. In some implementations, determining whether or not a particular object is occluded includes performing computer vision with respect to image data of a physical environment.

In some implementations, the first subset of nodes includes a compound node, and the first subset of nodes includes a plurality of nodes that each comprise a respective portion of the compound node. Moreover, in some implementations, identifying the first subset of nodes includes determining that the compound node satisfies the relevancy criterion, and in response to determining that the compound node satisfies the relevancy criterion, identifying each of the plurality of nodes as part of the first subset of nodes. For example, with reference to FIGS. 2H and 3B, based on determining that the second painting node 208 satisfies the relevancy criterion, the method 500 includes identifying the second canvas node 208a and the second frame node 208b as part of the first subset of nodes. Foregoing determining whether each of the plurality of nodes satisfies the relevancy criterion reduces resource utilization of an electronic device performing the method 500. In some implementations, a first subset of nodes of a compound node satisfies the relevancy criterion, whereas a second subset of nodes of the compound node does not satisfy the relevancy criterion. For example, the compound node represents a virtual dinosaur, and is comprised of a head node (representing a head of the virtual dinosaur), an upper body node (representing an upper body of the virtual dinosaur), and a lower body node (representing a lower body of the virtual dinosaur). Continuing with this example, the head of the virtual dinosaur is within the viewable region, whereas the lower and upper body of the virtual dinosaur are outside of the viewable region. Accordingly, in some implementations, the method 500 assessing the head node, the upper body node, and the lower body node, and determining that the head node satisfies the relevancy criterion, whereas the the lower and upper nodes do not satisfy the relevancy criterion.

In some implementations, identifying the first subset of nodes is further based on a resource utilization level associated with an electronic device performing the method 500. For example, the electronic device includes a processor that renders the first subset of objects in order to generate a plurality of video frames, and the method 500 includes displaying the plurality of video frames (including the second painting 318 and the third painting 320), as illustrated in FIGS. 3B-3D. The resource utilization level may characterize the processor rendering a particular video frame of the plurality of video frames. In some implementations, the number of the first subset of nodes is inversely related to the resource utilization level. For example, when the processor is characterized by a relatively high resource utilization level in rendering a particular video frame (e.g., a complex video frame or high resolution video frame), the number of the first subset of nodes is relatively small.

As represented by block 511, in some implementations, the method 500 includes assessing the relevancy criterion according to batch processing. For example, rendering each of the plurality of video frames is associated with a corresponding duration (e.g., amount of time), and the plurality of (rendered) video frames is displayed at a given frame rate (e.g., 60) frames per second (FPS)). In some circumstances, the processor has remaining time between the rendering of successive video frames, and can use assess the relevancy criterion with respect to at least a portion of the plurality of nodes during the remaining time. For example, between rendering a first video frame and a second video frame, the processor determines whether a first portion (e.g., a first batch) of the plurality of nodes satisfies the relevancy criterion, and between rendering the second video frame and a third video frame, the processor determines whether a second portion (e.g., a second batch) of the plurality of nodes satisfies the relevancy criterion. The processor may perform hit testing once the processor has assessed the entirety of the plurality of nodes based on the relevancy criterion. Accordingly, in some circumstances, although the processor may not perform hit testing with respect to every video frame (e.g., at the given frame rate), performing batch processing provides the processor with adequate resources to render video frames at the given frame, thereby avoiding introducing dropped video frames. Moreover, because the processor may be performing additional operations (e.g., updating the gaze vector, tracking the position of the electronic device, etc.), batch processing provides the processor with more control regarding allocation of its resources.

As represented by block 512, in some implementations, the method 500 includes determining a plurality of relevancy scores respectively associated with the first subset of objects. Each of the plurality of relevancy scores may be based on a respective position of a corresponding object of the first subset of objects. In some implementations, for a particular object of the first subset of objects, the relevancy score is inversely related to a distance between the center of the viewable region (or a spatial selector) and the particular object. For example, with reference to FIGS. 3B and 4, the electronic device 310 determines a relevancy score of '9' for the second painting 318, and determines a relevancy score of '7' for the third painting 320, because the second painting 318 is nearer to the center of the viewable region 314 than is the third painting 320. In some implementations, for a particular object of the first subset of objects, the relevancy score is inversely related to an apparent depth between the electronic device and the particular object. For example, a first menu is displayed at an apparent first depth, which is lower than an apparent second depth at which a second menu is displayed. Continuing with this example, the method 500 includes determining a higher relevancy score for the first menu than for the second menu.

As represented by block 514, in some implementations, the method 500 includes determining an order for assessing the first subset of objects relative to each other, wherein the order is based on the plurality of relevancy scores. In some implementations, the order of assessing a particular object is inversely related to the relevancy score of the particular object relative to relevancy scores of other object(s). Continuing with the previous example, because the first menu appears closer (higher relevancy score), a user may be more likely to engage with (e.g., gaze at) the first menu than the second menu, and thus the method 500 may include assessing the first menu before assessing the second menu, as represented by block 526.

As represented by block 516, in some implementations, the method 500 includes identifying, within the plurality of nodes, a second subset of nodes (e.g., the second subset 220) illustrated in FIG. 2I) by determining that each of the second subset of nodes does not satisfy the relevancy criterion with respect to the viewable region. For example, with reference to FIGS. 2F, 2G, and 3B, the electronic device 310 determines that the first painting node 206 (and its constituent nodes 206a/206b) does not satisfy the relevancy criterion because the position of the first painting 316 is outside of the viewable region. In some implementations, the second subset of nodes includes a parent node and a child node of the parent node, and identifying the second subset of nodes includes determining that the parent node does not satisfy the relevancy criterion, and in response to determining that the parent node does not satisfy the relevancy criterion, identifying the parent node and the child node as part of a second subset of objects. For example, with reference to FIGS. 2B, 2C, and 3A, based on determining that the second room node 214 identifies a different physical environment than the physical office 300, the method 500 includes identifying the second room node 214, the dragon node 216, and dinosaur node 218 as part of the second subset of nodes. As another example, with reference to FIGS. 2F, 2G, and 3B, based on determining that the first painting node 206 indicates that the first painting 316 is outside of the viewable region 314, the method 500 includes identifying the first painting node 206, the first canvas node 206a, and the first frame node 206b as part of the second subset of nodes. Foregoing determining whether the child node(s) satisfy the relevancy criterion reduces resource utilization of an electronic device performing the method 500.

As represented by block 517, the second subset of nodes respectively represent a second subset of objects. For example, with reference to FIGS. 2G and 3B, the second subset 220 includes the first painting node 206 that represents the first painting 316 (not displayed), and the second subset 220 includes the credenza node 212 that represents the credenza 322 (occluded by the physical bookshelf 306).

As represented by block 518, the method 500 includes assessing the first subset of objects in order to determine whether a spatial selector intersects with a particular object of the first subset of the objects. In some implementations, assessing the first subset of objects includes performing hit testing with respect to the first subset of objects. The hit testing may be performed across different angles. For example, with reference to FIGS. 2I and 3C, the spatial selector is based on a gaze vector 324, and the method 500 includes assessing the second painting 318 and third painting 320, and determining that the gaze vector 324 intersects with the second painting 318.

As represented by block 520, in some implementations, determining whether the spatial selector intersects with the particular object is based on eye tracking data that indicates a gaze of an eye of a user. For example, the eye tracking data is output from an eye tracker that emits light onto the eye, and captures image data of the eye that indicates light reflected off the eye. Continuing with this example, the eye tracker performs computer vision with respect to the image data of the eye to track the position of the eye. In some implementations, determining that the spatial selector intersects with the particular object includes determining, based on the eye tracking data, that the gaze remains on the particular object for at least a threshold amount of time. In some implementations, the spatial selector is based on a gaze vector, which is based on the eye tracking data. For example, with reference to FIGS. 3C and 3D, the electronic device 310 determines, based on eye tracking data and image data of the physical office 300, that the gaze vector 324 intersects with the second painting 318. In some implementations, the method 500 includes determining the gaze vector based on a depth between the particular object and an electronic device.

In some implementations, the spatial selector is based on a gaze cone, which is based on the eye tracking data and the gaze vector. For example, determining whether the spatial selector intersects with the particular object includes determining that the gaze cone intersects with the particular object. In some implementations, the vertex of the gaze cone is positioned at an eye of the user, and positioned at an angle such that the gaze vector runs through the center of the gaze cone. The radial tolerance of the gaze cone may be adjusted based on the reliability of the eye tracking data.

As represented by block 522, in some implementations, determining whether the spatial selector intersects with the particular object is based on extremity tracking of an extremity of a user. As one example, with reference to FIG. 3C, a finger of the right hand of the user 50 corresponds to a position of the second painting 318, and thus the electronic device 310 determines that the spatial selector (e.g., the finger) intersects with the second painting 318. To that end, in some implementations and with reference to FIG. 3A, the electronic device 310 includes an image sensor that captures image data of the physical environment 300, and the electronic device 310 performs computer vision with respect to the image data in order to identify the finger within the image data.

As represented by block 524, in some implementations, determining whether the spatial selector intersects with the particular object is based on a head forward vector. The head forward vector characterizes a position (e.g., orientation) of an electronic device performing the method 500. For example, the head forward vector is substantially normal (e.g., orthogonal) to the electronic device. To that end, in some implementations, the electronic device includes a positional sensor (e.g., an inertial measurement unit (IMU)) that generates positional sensor data, and the method 500 includes determining the head forward vector based on the positional sensor data.

As represented by block 526, in some implementations, assessing the first subset of objects is according to the order described with reference to block 514. For example, with reference to FIGS. 3B and 4, the electronic device 310 assesses the second painting 318 before (because of higher relevancy score) assessing the third painting 320. In some implementations, based on determining that the spatial selector intersects with the second painting 318, the electronic device 310 foregoes determining whether the spatial selector intersects with the third painting 320, reducing resource utilization by the electronic device 310.

As represented by block 528, in some implementations, the method 500 includes foregoing assessing the second subset of objects in order to determine whether the spatial selector intersects with the particular object. For example, with reference to FIG. 3C, the electronic device 310 foregoes determining whether the gaze vector 324 intersects with the first painting 316 or the credenza 322. Foregoing assessing the second subset of objects reduces resource utilization of the electronic device 310.

As represented by block 530, the method 500 includes selecting the particular object based on determining that the spatial selector intersects with the particular object. For example, in response to determining that the gaze vector 324 intersects with the second painting 318 in FIG. 3C, the electronic device 310 selects the second painting 318 in FIG. 3D. In some implementations, selecting the particular object includes changing an appearance of the particular object, such as changing the second painting 318 from solid lines to dotted lines between FIGS. 3C and 3D. In some implementations, selecting the particular object includes displaying a selection indicator (e.g., a graphic next to the particular object), while maintaining the appearance of the particular object. In some implementations in which the particular object is associated with an application, selecting the particular object includes launching the application. In some implementations, selecting the particular object includes generating a selection indicator that indicates selection of the particular object, and the electronic device may or may not change displayed content. For example, a first electronic device (e.g., the electronic device 310) determines that the spatial selector intersects with the particular object, and transmits a selection indicator to a second electronic device, which is in a copresence session with the first electronic device. Continuing with this example, the second electronic device may modify its own operating environment, based on receiving the selection indicator from the first electronic device.

In some implementations, method 500 advantageously reduces the computational resources to perform a computationally expensive operation (e.g., hit testing) by performing a less computationally expensive operation to filter the nodes in the scene graph.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at an electronic device with one or more processors, a non-transitory memory, and a display:
        obtaining a scene graph that includes a plurality of nodes, wherein each of the plurality of nodes represents an object;
        identifying, within the plurality of nodes, a first subset of nodes based on each of the first subset of nodes satisfying a relevancy criterion with respect to a viewable region associated with the display, wherein the first subset of nodes respectively represents a first subset of objects;
        assessing the first subset of objects in order to determine whether a spatial selector intersects with a particular object of the first subset of the objects;
        maintaining, within the plurality of nodes, a second subset of nodes based on each of the second subset of nodes not satisfying the relevancy criterion with respect to the viewable region, wherein the second subset of nodes respectively represents a second subset of objects and does not include a root node of the scene graph; and
        selecting the particular object based on determining that the spatial selector intersects with the particular object.

2. The method of claim 1, wherein the scene graph indicates respective positions of the first subset of objects, and wherein identifying the first subset of nodes comprises determining that each of the respective positions satisfies the relevancy criterion.

3. The method of claim 2, wherein satisfaction of the relevancy criterion is based on each of the respective positions being within the viewable region.

4. The method of claim 3, wherein satisfaction of the relevancy criterion is further based on each of the respective positions satisfying a non-occlusion condition.

5. The method of claim 2, the method further comprising determining a plurality of relevancy scores respectively associated with the first subset of objects, wherein each of the plurality of relevancy scores is based on a respective position of a corresponding object of the first subset of objects.

6. The method of claim 5, wherein, for at least one object of the first subset of objects, the plurality of relevancy scores is inversely related to a distance between center of the viewable region and the at least one object.

7. The method of claim 5, wherein, for at least one object of the first subset of objects, the plurality of relevancy scores is inversely related to an apparent depth between the electronic device and the at least one object.

8. The method of claim 5, further comprising determining an order for assessing the first subset of objects relative to each other, wherein the order is based on the plurality of relevancy scores, and wherein assessing the first subset of objects is according to the order.

9. The method of claim 1, wherein the viewable region corresponds to a portion of a physical environment, wherein the first subset of nodes includes a first node, and wherein determining that the first node satisfies the relevancy criterion comprises determining that the first node includes an identifier that identifies the physical environment.

10. The method of claim 1, wherein the first subset of nodes includes a compound node, wherein the first subset of nodes includes a plurality of respective nodes that each comprise a respective portion of the compound node, and wherein identifying the first subset of nodes comprises:
    determining that the compound node satisfies the relevancy criterion; and
    in response to determining that the compound node satisfies the relevancy criterion, identifying each of the plurality of respective nodes as part of the first subset of nodes.

11. The method of claim 1, further comprising:
    foregoing assessing the second subset of objects in order to determine whether the spatial selector intersects with the particular object.

12. The method of claim 11, wherein the second subset of nodes includes a parent node and a child node of the parent node, and wherein identifying the second subset of nodes comprises:
    determining that the parent node does not satisfy the relevancy criterion; and
    in response to determining that the parent node does not satisfy the relevancy criterion, identifying the parent node and the child node as part of the second subset of objects.

13. The method of claim 1, wherein assessing the first subset of objects comprises performing hit testing with respect to the first subset of objects.

14. The method of claim 1, wherein the electronic device includes an eye tracker that generates eye tracking data, and wherein determining that the spatial selector intersects with the particular object is based on the eye tracking data.

15. The method of claim 14, further comprising determining a gaze vector based at least in part on the eye tracking data, wherein determining that the spatial selector intersects with the particular object comprises determining the gaze vector intersects with the particular object.

16. The method of claim 1, wherein the electronic device includes an extremity tracker that tracks an extremity, and wherein determining that the spatial selector intersects with the particular object comprises determining that the extremity intersects with the particular object based on the tracking.

17. The method of claim 1, wherein the electronic device includes a positional sensor that generates positional sensor data, the method further comprising determining a head forward vector associated with the electronic device based on the positional sensor data, wherein determining that the spatial selector intersects with the particular object comprises determining that the head forward vector intersects with the particular object.

18. The method of claim 1, wherein the first subset of nodes includes a parent node and a child node of the parent node, and the method further comprising:
 determining that the parent node which used to satisfy the relevancy criterion no longer satisfies the relevancy criterion; and
 in response to determining that the parent node no longer satisfies the relevancy criterion, adding the child node to the second subset of nodes.

19. An electronic device comprising:
 one or more processors;
 a non-transitory memory;
 a display; and
 one or more programs, wherein the one or more programs are stored in the non-transitory memory and configured to be executed by the one or more processors, the one or more programs including instructions for:
  obtaining a scene graph that includes a plurality of nodes, wherein each of the plurality of nodes represents an object;
  identifying, within the plurality of nodes, a first subset of nodes based on each of the first subset of nodes satisfying a relevancy criterion with respect to a viewable region associated with the display, wherein the first subset of nodes respectively represents a first subset of objects;
  assessing the first subset of objects in order to determine whether a spatial selector intersects with a particular object of the first subset of the objects;
  maintaining, within the plurality of nodes, a second subset of nodes based on each of the second subset of nodes not satisfying the relevancy criterion with respect to the viewable region, wherein the second subset of nodes respectively represents a second subset of objects and does not include a root node of the scene graph; and
  selecting the particular object based on determining that the spatial selector intersects with the particular object.

20. A non-transitory computer readable storage medium storing one or more programs, the one or more programs comprising instructions, which, when executed by an electronic device with one or more processors and a display, cause the electronic device to:
 obtain a scene graph that includes a plurality of nodes, wherein each of the plurality of nodes represents an object;
 identify, within the plurality of nodes, a first subset of nodes based on each of the first subset of nodes satisfying a relevancy criterion with respect to a viewable region associated with the display, wherein the first subset of nodes respectively represents a first subset of objects;
 assess the first subset of objects in order to determine whether a spatial selector intersects with a particular object of the first subset of the objects;
 maintain, within the plurality of nodes, a second subset of nodes based on each of the second subset of nodes not satisfying the relevancy criterion with respect to the viewable region, wherein the second subset of nodes respectively represents a second subset of objects and does not include a root node of the scene graph; and
 select the particular object based on determining that the spatial selector intersects with the particular object.

* * * * *